United States Patent [19]
Nagamatsu et al.

[11] Patent Number: 6,148,339
[45] Date of Patent: Nov. 14, 2000

[54] HEALTH CHECK SYSTEM IN NETWORK CONTROL SYSTEM UTILIZING CORBA'S EVENT SERVICE

[75] Inventors: Osamu Nagamatsu; Keiko Arima, both of Tokyo, Japan

[73] Assignee: NEC Corporation, Tokyo, Japan

[21] Appl. No.: 09/057,960

[22] Filed: Apr. 9, 1998

[30] Foreign Application Priority Data

Sep. 4, 1997 [JP] Japan ..................................... 9-090404

[51] Int. Cl.[7] ............................................... G06F 15/173
[52] U.S. Cl. ........................ 709/224; 709/202; 709/203; 709/223; 709/228; 709/238; 714/43; 714/47
[58] Field of Search ................... 709/200–203, 709/206, 217–219, 223–224, 227–230, 238–239, 241; 707/10, 100–104, 200–206; 714/1–2, 4, 25, 43, 47; 370/351, 400

[56] References Cited

U.S. PATENT DOCUMENTS

| | | | |
|---|---|---|---|
| 4,251,858 | 2/1981 | Cambigue et al. ........................... | 700/3 |
| 4,558,413 | 12/1985 | Schmidt et al. ........................ | 707/203 |
| 4,714,992 | 12/1987 | Gladney et al. ........................ | 707/206 |
| 4,751,635 | 6/1988 | Kret ........................................... | 707/10 |
| 5,005,122 | 4/1991 | Griffin et al. ............................ | 709/203 |
| 5,109,486 | 4/1992 | Seymour .................................. | 709/224 |
| 5,220,655 | 6/1993 | Tsutsui .................................... | 709/229 |
| 5,261,096 | 11/1993 | Howarth .................................. | 709/242 |
| 5,640,556 | 6/1997 | Tamura .................................... | 709/219 |
| 5,719,861 | 2/1998 | Okanoue .................................. | 370/351 |
| 5,870,540 | 2/1999 | Wang et al .............................. | 714/43 |
| 5,907,676 | 5/1999 | Fujishiro et al. ........................ | 709/203 |
| 5,918,020 | 6/1999 | Blackrd et al. .......................... | 709/228 |
| 5,925,137 | 7/1999 | Okanoue et al. ........................ | 709/239 |
| 5,951,645 | 9/1999 | Goto ........................................ | 709/230 |
| 6,021,443 | 2/2000 | Bracho et al. ........................... | 709/241 |
| 6,049,819 | 4/2000 | Buckle et al. ........................... | 709/202 |

FOREIGN PATENT DOCUMENTS

| | | | |
|---|---|---|---|
| 1-118939 | 5/1989 | Japan .............................. | G06F 11/30 |
| 2-310755 | 12/1990 | Japan .............................. | G06F 13/00 |
| 3-209520 | 9/1991 | Japan .............................. | G06F 9/06 |
| 7-168789 | 7/1995 | Japan .............................. | G06F 15/16 |
| 7-306820 | 11/1995 | Japan .............................. | G06F 13/00 |
| 8-36486 | 2/1996 | Japan .............................. | G06F 9/06 |
| 8-44677 | 2/1996 | Japan .............................. | G06F 15/16 |
| 8-115288 | 5/1996 | Japan .............................. | G06F 13/00 |
| 8-116322 | 5/1996 | Japan .............................. | G06F 13/00 |

OTHER PUBLICATIONS

Hirofumi Onodera, "CORBA: A Distributed Object Oriented Technology," published by Soft Research Center, Apr. 25, 1996, pp. 182–185, (No translation).

*Primary Examiner*—Zarni Maung
*Assistant Examiner*—Bharat Barot
*Attorney, Agent, or Firm*—Scully, Scott, Murphy & Presser

[57] ABSTRACT

A network management system utilizing the push style in which transmission of an event from a server to a client is performed asynchronously via an event channel. The server includes a transmitter for transmitting data at a predetermined time interval, for detecting any communication errors between the server and the client. Thus, the requested client can detect errors such as a disconnection between the client and the server and a recording medium on which a network management program is recorded.

9 Claims, 8 Drawing Sheets

HEALTH CHECK SYSTEM IN NETWORK CONTROL SYSTEM UTILIZING CORBA'S EVENT SERVICE

BACKGROUND OF THE INVENTION

The present invention relates to a network management system and method and a recording medium on which a network management program is recorded. In particular, the present invention relates to a health check function for detecting any disconnection between a client and a server in a client/server type network management system.

Conventionally, a client/server type system exists as a network management system of this kind, which utilizes Common Object Request Broker Architecture (CORBA). The event service in this system is an implementation of asynchronous event communications between a client and a server.

FIG. 6 illustrates a structure diagram of a client/server type system utilizing CORBA. CORBA is a standard technology by Object Management Group (OMG) which is engaged in the standardization of distributed object technologies. With CORBA, an exchange of methods to and from an object existing somewhere on a distributed object is mediated by an Object Request Broker (ORB) which is one of the components comprising a distributed object environment. In other words, a client 7 does not need to know whether a server 6 is located on the same machine or on a network by virtue of the use of an ORB 5 and is able to transparently invoke a method contained in the server 6.

Besides the ORB 5, another component comprising the distributed object environment is a common object service. Among this service provided by CORBA, asynchronous communications between the client 7 and the server 6 is implemented by an event service. In the event service, a sender of events is referred to as "supplier" and a receiver of events is referred to as "consumer." The asynchronous communications are implemented by the use of an object called "event channel." The event channel allows a plurality of suppliers to communicate with a plurality of consumers asynchronously and without any knowledge of each other.

There are provided two ways of event communications using the event channel, namely, the push style and the pull style. FIGS. 7 and 8 illustrate these event communication methods, respectively.

For the push style as shown in FIG. 7, a supplier 8 is to have an initiative and transmit events to consumers 10-1 and 10-2. Specifically, the supplier 8 will first be requesting while an event channel 9 requested so that data may be transmitted from the supplier 8 to the event channel 9. The event channel 9 will then be requesting and the consumers 10-1 and 10-2 requested, so that the event channel may transmit the data to the consumers 10-1 and 10-2.

For the pull style as shown in FIG. 8 on the other hand, a consumer 10-1 is to have an initiative and request events from a supplier 8. Specifically, the consumer 10-1 will initially be requesting while an event channel 9 requested so that the consumer 10-1 may request data to be transmitted from the event channel 9. The event channel 9 will then be requesting and the supplier 8 requested, so that the event channel 9 may request the data to be transmitted from the supplier 8.

The client/server type system utilizing CORBA as described above is discussed in detail by Hirofumi Onodera in "CORBA: A Distributed Object Oriented Technology," published by Soft Research Center, Apr. 25, 1996, pp. 182 to 185.

For the client/server system utilizing conventional CORBA as described above, there are two methods for event communications using the event channel, namely, the push style and the pull style. In this case, for the pull style, a client is requesting from the event channel and is therefore able to detect any errors. For the push style, however, the client will be requested by the event channel and is therefore unable to detect errors such as disconnection.

Consequently, in the pull style event service, the client that is a consumer can detect errors such as disconnection while in the push style, the client can not detect such errors.

SUMMARY OF THE INVENTION

It is therefore an object of the present invention to overcome the problem as described above and to provide a network management system and method in which a requested client can detect errors such as disconnection between the client and the server and a recording medium on which a network management program is recorded.

According to an aspect of the present invention, there is provided a network management system utilizing the push style in which transmission of an event from a server to a client is performed asynchronously via an event channel, wherein the server includes transmission means for transmitting data at a predetermined time interval for detecting any communication errors between the server and the client.

According to another aspect of the present invention, there is provided a network management system utilizing the push style in which transmission of an event from a server to a client is performed asynchronously via an event channel, wherein the client includes reception means for receiving data transmitted from the server for detecting any communication errors between the server and the client, detection means for detecting whether, after receiving the data by the reception means, either data to be sent subsequently to the data or the event has been received or not within a predefined period of time, and means for sending an alarm when the detection means have detected that neither the data to be sent subsequently nor the event has been received within the predefined period of time.

According to another aspect of the present invention, there is provided a network management system, wherein the server includes transmission means for transmitting data at a predetermined time interval for detecting any communication errors between the server and the client, and the client includes reception means for receiving the data, detection means for detecting whether, after receiving the data by the reception means, either data to be sent subsequently to the data or the event has been received or not within a predefined period of time, and means for sending an alarm when the detection means have detected that neither the data to be sent subsequently nor the event has been received within the predefined period of time.

According to still another aspect of the present invention, there is provided a network management method utilizing the push style in which transmission of an event from a server to a client is performed asynchronously via an event channel, wherein the server includes a step for transmitting data at a predetermined time interval for detecting any communication errors between the server and the client.

According to another aspect of the present invention, there is provided a network management method utilizing the push style in which transmission of an event from a server to a client is performed asynchronously via an event channel, wherein the client includes a first step for receiving data transmitted from the server for detecting any communication errors between the server and the client, a second step for detecting whether, after receiving the data by the reception means, either data to be sent subsequently to the data or the event has been received or not within a predefined period of time, and a third step for sending an alarm when the detection means have detected that neither the data to be sent subsequently nor the event has been received within the predefined period of time.

According to another aspect of the present invention, there is provided a network management method utilizing the push style in which transmission of an event from a server to a client is performed asynchronously via an event channel, comprising the steps of: transmitting data at a predetermined time interval for detecting any communication errors between the server and the client; receiving the data at the client; detecting whether, after receiving the data, either data to be sent subsequently to the data or the event has been received or not within a predefined period of time; and sending an alarm upon detecting that neither the data to be sent subsequently nor the event has been received within the predefined period of time.

According to still another aspect of the present invention, there is provided a recording medium on which a network management program is recorded, the network management program utilizing the push style in which transmission of an event from a server to a client is performed asynchronously via an event channel, wherein the network management program adapts control means for controlling transmission and reception of the event in such a manner that the server may transmit data at a predetermined time interval for detecting any communication errors between the server and the client.

According to another aspect of the present invention there is provided a recording medium on which a network management program is recorded, the network management program utilizing the push style in which transmission of an event from a server to a client is performed asynchronously via an event channel, wherein the network management program adapts control means for controlling transmission and reception of the event in such a manner that the client may send an alarm upon detecting that, after receiving data transmitted from the server for detecting communication errors between the server and the client, neither data to be sent subsequently to the data nor the event has been received within a predefined period of time.

According to another aspect of the present invention, there is provided a recording medium on which a network management program is recorded, the network management program utilizing the push style in which transmission of an event from a server to a client is performed asynchronously via an event channel, wherein the network management program adapts control means for controlling transmission and reception of the event in such a manner that the server may transmit data for detecting any communication errors between the server and the client and/or a predetermined time interval and the client may send an alarm upon detecting that, after receiving the data, neither data to be sent subsequently to the data nor the event has been received within a predefined period of time.

With an event service which incorporates a health check function according to the present invention, a client/server type network management system utilizing CORBA enables a client that is a consumer to detect communication errors such as disconnection for the push style event service which enables asynchronous communications.

More specifically, the health check function is provided which transmits health check data from the server that is a supplier to the client that is a consumer at each health check transmission period defined in a configuration file and, when either the health check data or an event has not been received, assumes that disconnection has occurred. In other words, according to the network management system of the present invention, the server that is a supplier transmits the health check data to the client that is a consumer at each transmission period defined in the configuration file.

If either the health check data or the event has not been received within the elapse of a timeout period defined in the configuration file, then the client will detect communication errors such as disconnection between the client and the server.

This allows the client that is a consumer and is requested to detect any communication errors such as disconnection between the client and the server in the push style event service, one of the common object services of CORBA.

Other objects and features will be clarified from the following description with reference to attached drawings.

PREFERRED EMBODIMENTS OF THE INVENTION

Embodiments of the present invention will now be described with reference to the drawings.

Figure 1:
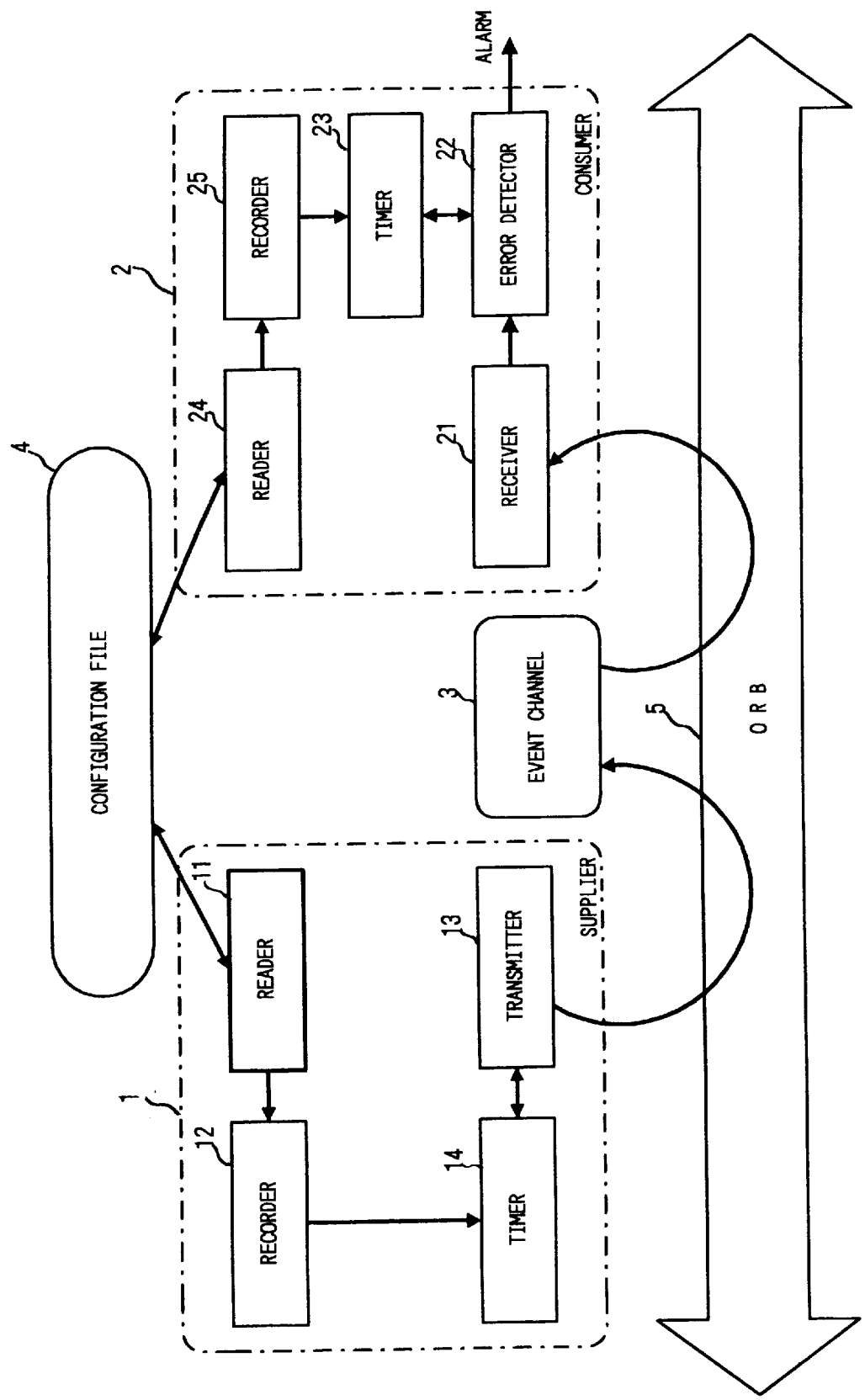
FIG. 1 is a block diagram illustrating a structure of a network management system according to one embodiment of the present invention.

FIG. 1 is a block diagram illustrating a structure of a network management system according to one embodiment of the present invention. As shown, the network management system according to the embodiment of the present invention comprises a supplier 1 that is a sender of events, a consumer 2 that is a receiver of events, an event channel 3 that is an object provided by Common Object Request Broker Architecture (CORBA), a configuration file 4 and an Object Request Broker (ORB) 5.

As used herein, "event" refers to an alarming notice or the like which is transmitted from a server (the supplier 1 in this embodiment) to a client (the consumer 2 in this embodiment.) An event will trigger status changes such that an element may be created anew or disappear, or alternatively such that the element may change its attribute values, join or leave a set.

The supplier 1 in the client/server type network management system designates a server that includes information relating to the network (Management Information Base, or MIB,) etc. The supplier 1 comprises a reader section 11 for reading a health check time period from the configuration file 4, a recorder section 12 for recording the data read by the reader section 11, a transmitter section 13 for transmitting health check data on the basis of the data from the recorder section 12, and a timer 14.

The consumer 2 in the client/server type network management system designates a client that includes a user interface section, etc. The consumer 2 comprises a receiver section 21 for receiving the health check data transmitted from the supplier 1, an error detector section 22 for supplying an alarm to the user upon detecting that the health check or event data has not been received within a time out period based on the data from a timer 23 and a recorder section 25, the timer 23, a reader section 24 for reading the time out period from the configuration file 4 and the recorder section 25 for recording the data read by the reader section 24.

The event channel 3 is a standard object provided by the event service, one of the common object services of CORBA. The event channel is located over an ORB 5, mediating both as a consumer and as a supplier for events. It allows a plurality of the suppliers 1 to communicate with a plurality of the consumers 2 asynchronously and without knowing each other.

The ORB 5 is one of the elements comprising CORBA and plays a role as a "platform" for constructing a distributed object application, enabling a client to request transparently from other objects, local or remote and/or to receive their responses.

A component of the present invention which has not conventionally been available is the configuration file 4. The configuration file 4 is a file on which the user defines two periods: the health check send time period and the time out period.

Figure 2:
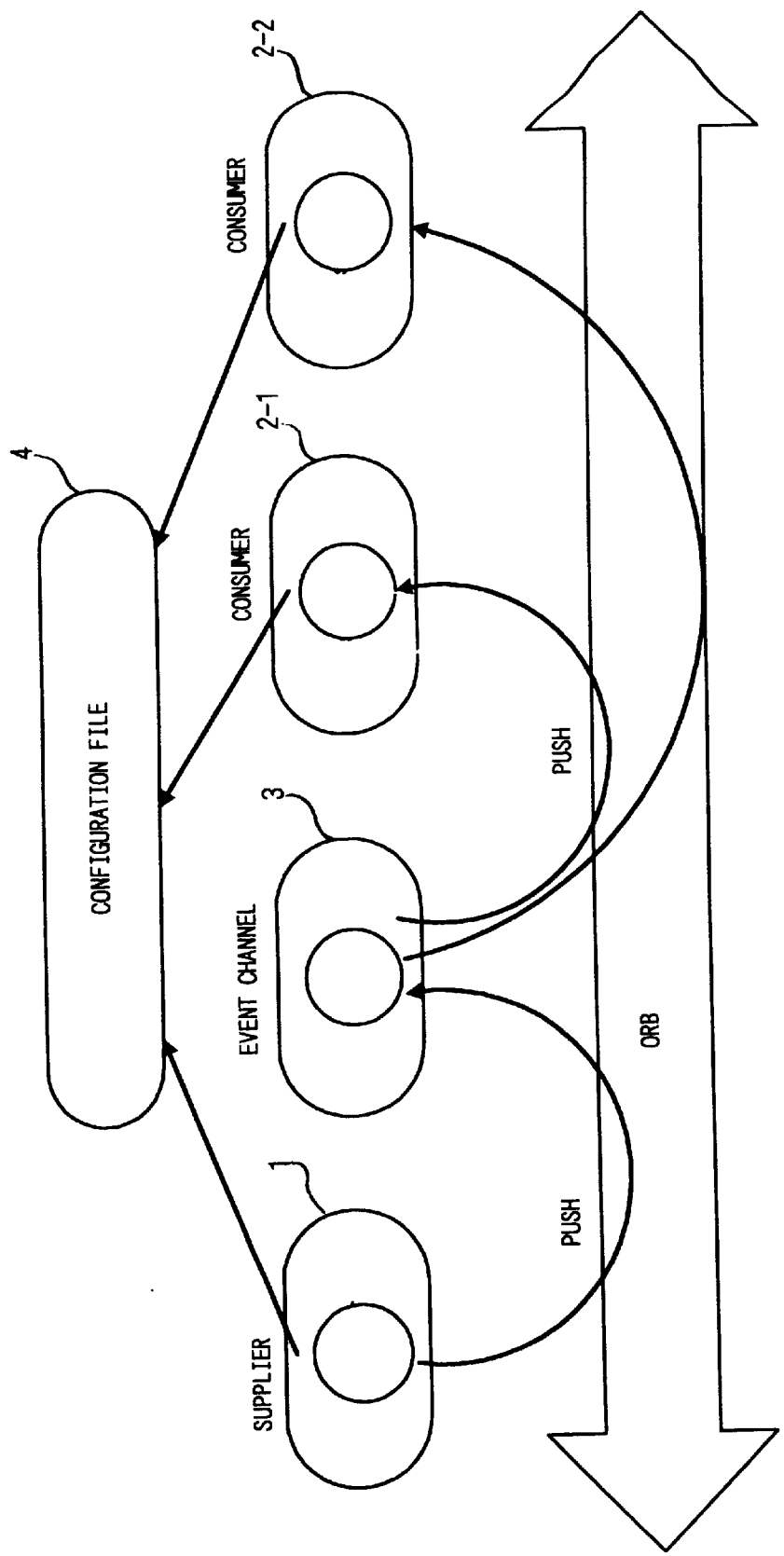
FIG. 2 illustrates an example of the system structure according to one embodiment of the present invention.

FIG. 2 illustrates an example of the system structure according to one embodiment of the present invention. As shown, a supplier 1 asynchronously transmits events to consumers 2-1 and 2-2 via an event channel 3 and an ORB 5. The supplier also transmits health check data to each of the consumers 2-1 and 2-2 at a health check time interval read from a configuration file 4 for detecting any communication errors between the supplier 1 and the consumers 2-1 and 2-2 respectively.

Each of the consumers 2-1 and 2-1 has the same structure as the consumer 2 shown in FIG. 1 and is adapted to supply an alarm to the user upon detecting that the health check data or an event has not been received within a time out period read from the configuration file 4.

Figure 3:
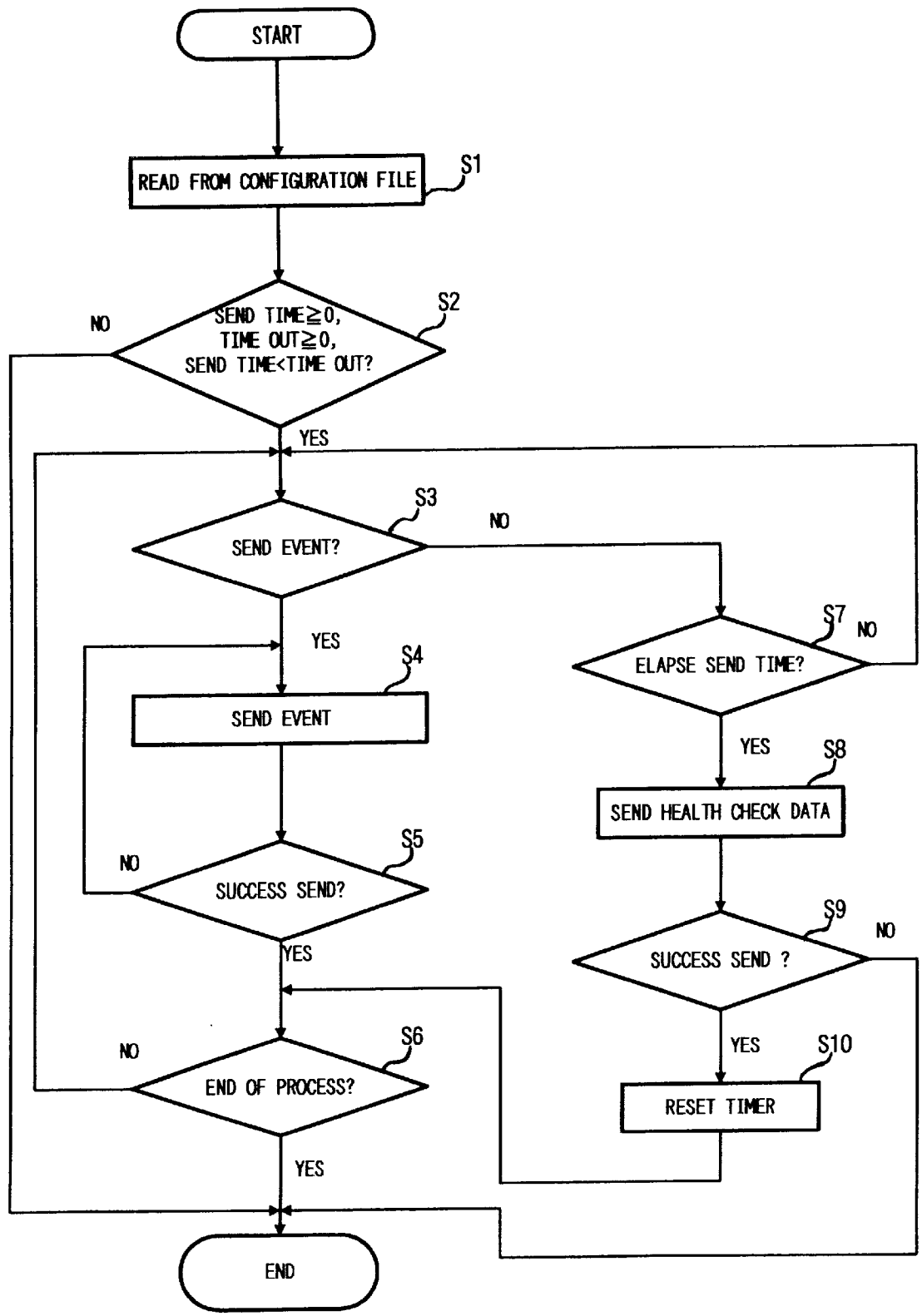
FIG. 3 is a flowchart for illustrating the operation of the supplier 1 in FIG. 1.
Figure 4:
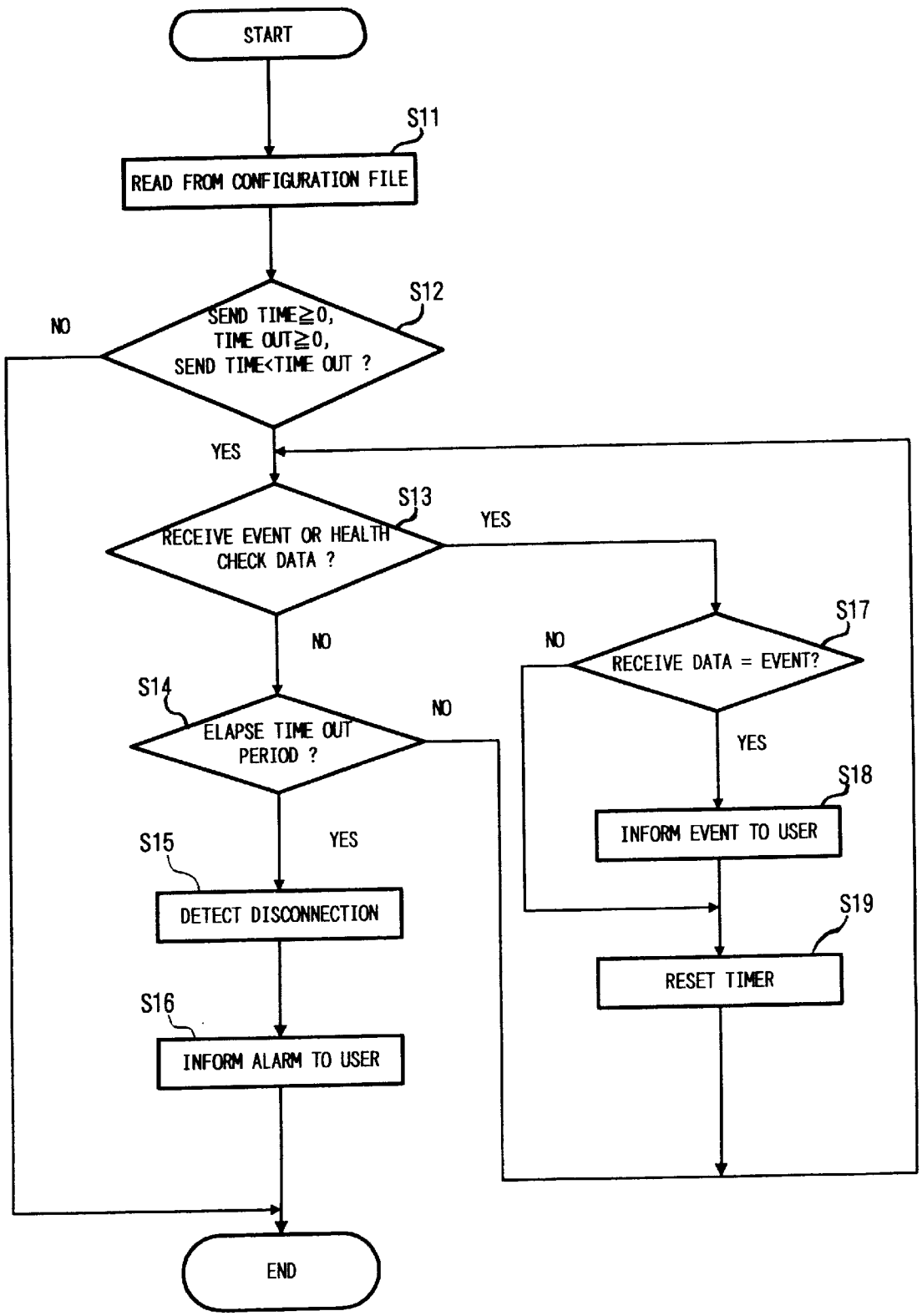
FIG. 4 is a flowchart for illustrating the operation of the consumer 2 in FIG. 1.

FIG. 3 is a flowchart for illustrating the operation of the supplier 1 in FIG. 1 and FIG. 4 is a flowchart for illustrating the operation of the consumer 2 in FIG. 1. The health check function according to one embodiment of the present invention will now be described with reference to FIGS. 1 to 4. The operation of the consumers 2-1 and 2-2 shown in FIG. 2 is identical to the operation of the consumer 2 shown in FIG. 4.

To start the operation, the reader sections 11 and 24 respectively of the supplier 1 and the consumer 2 read the health check send time period and the time out period defined by the user on the configuration file 4. (Step S1 in FIG. 3 and Step S11 in FIG. 4.) The supplier 1 and the consumer 2 will then check if those two values are equal to or greater than zero and, at the same time, if the time out period is greater in value than the health check send time period. (Step S2 in FIG. 3 and Step S12 in FIG. 4.)

Either if the health check send time period and the time out period defined in the configuration file 4 are negative in value or if the time out period is smaller in value than the health check send time period, the health check function will not be performed. The time out period must be greater in value than the health check send time period because if the time out period is smaller, a time out will occur for the part of the consumer 2 before the supplier 1 can transmit the health check data.

When the checks for the health check send time period and the time out period turn out to be normal, the supplier 1 will initiate a transmission of the health check data to the consumer 2 at each health check send time period (Steps S3, S7 and S8 of FIG. 3) and, if the transmission succeeds, will reset the timer 14 (Steps S9 and S10 of FIG. 3.) The health check data must be in a format distinguishable from the data of usual events such as alarm notice, etc. Also, when requested by the user, the supplier 1 will initiate a transmission of an alarm notice (event) to the consumer 2 in addition to the transmission of the health check data. (Steps S3 to S6 of FIG. 3.) When the data received is an alarm notice (Steps S13 and S17 of FIG. 4) the consumer 2 will inform the user of it and then reset the timer 23 (Steps S18 and S19 of FIG. 4.) Also, when the data is the health check data (Steps S13 and S17 of FIG. 4) the consumer 2 will reset the timer 23 (Step S19 of FIG. 4) and then wait for the next health check data to be transmitted.

If the health check data has not been received on the part of the consumer 2 within the elapse of a time out period (Step 14 of FIG. 4) the consumer 2 will assume that a communication error such as disconnection has occurred in the communication between the client and the server (Step S15 of FIG. 4) and will then detect the communication error before passing an alarm on to the user (Step S16 of FIG. 4.)

The consumers 2-1 and 2-2 shown in FIG. 2 operate in the same manner as the consumer 2 described above. In addition, the operation of the supplier 1 and the consumers 2, 2-1 and 2-3 may be implemented by means of a program, which can be stored in a recording medium such as a floppy diskette or a memory.

Figure 5:
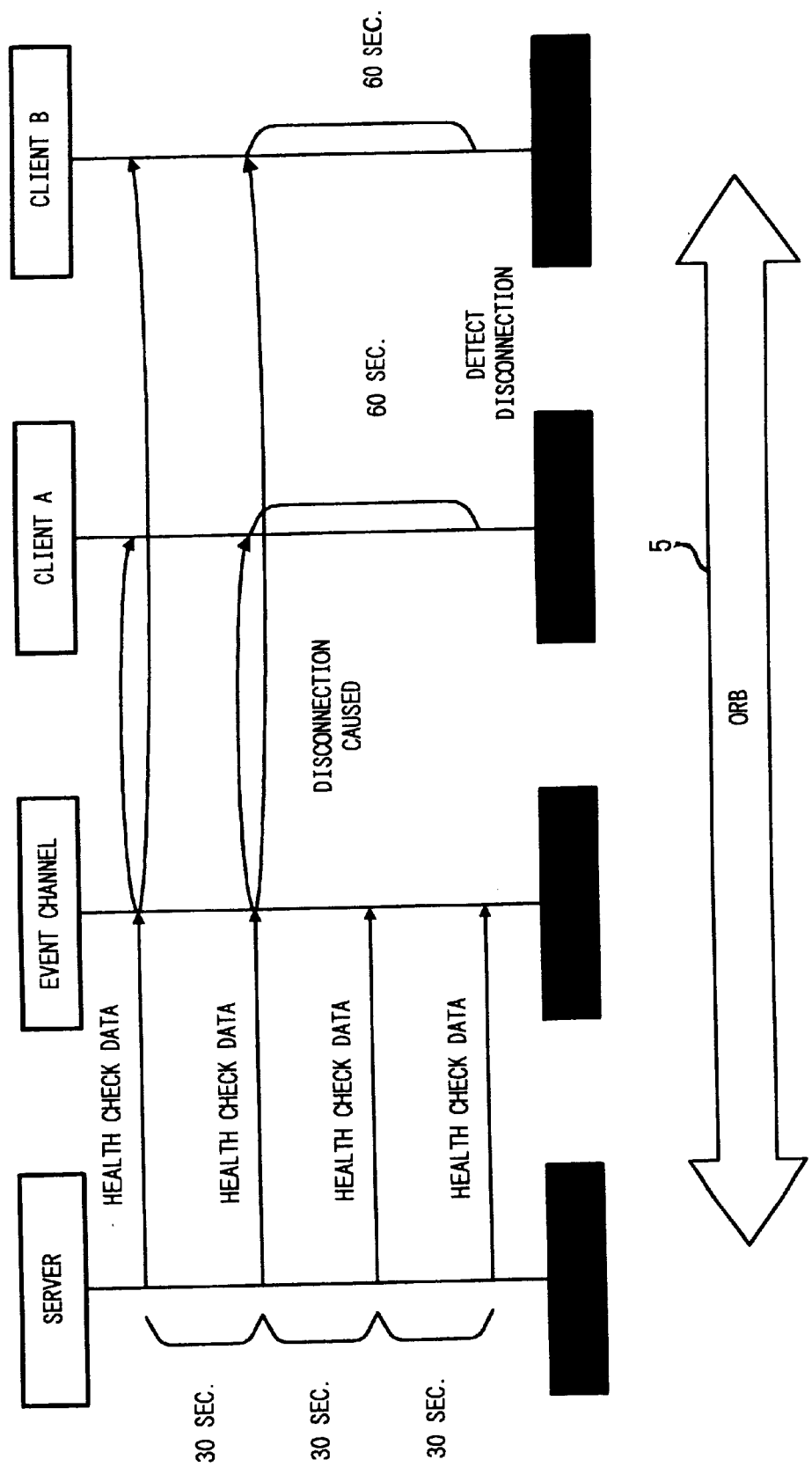
FIG. 5 illustrates the operation of the health check function in the system shown in FIG. 2.
Figure 6:
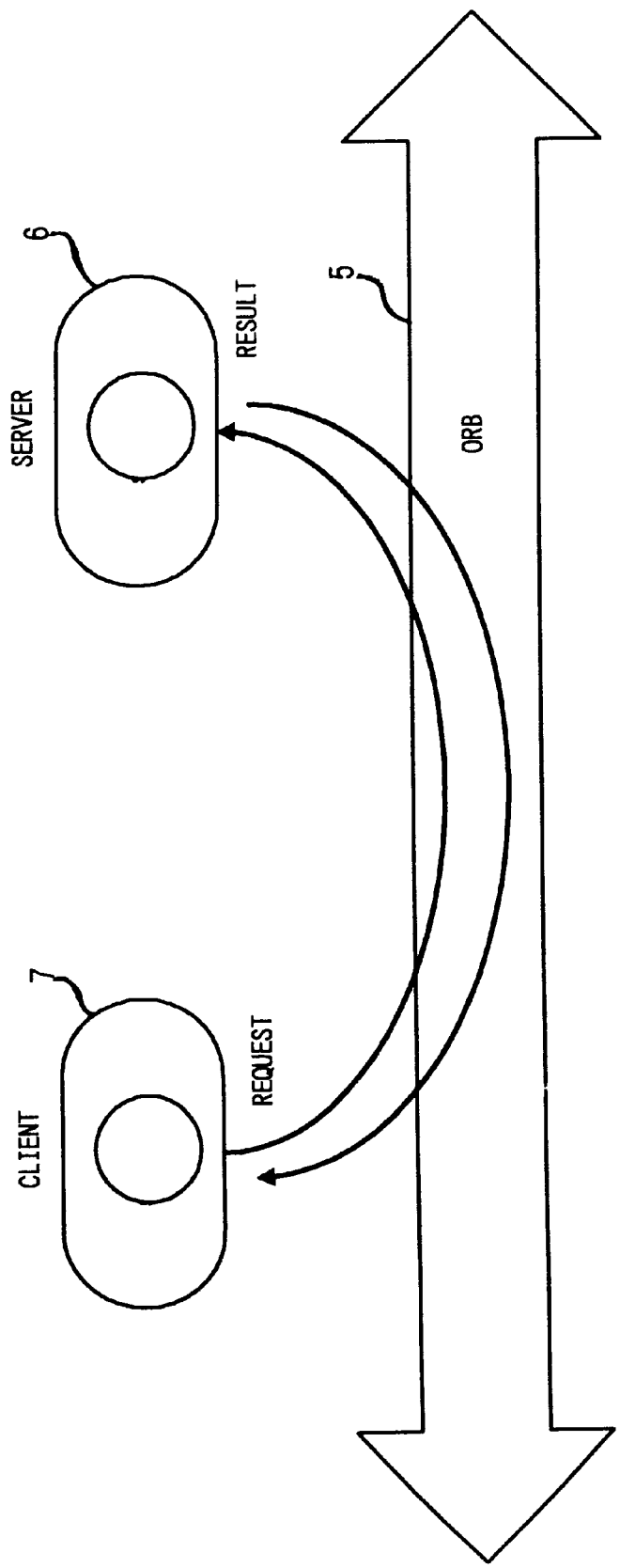
FIG. 6 illustrates a structure diagram of a client/server type system utilizing CORBA.
Figure 7:
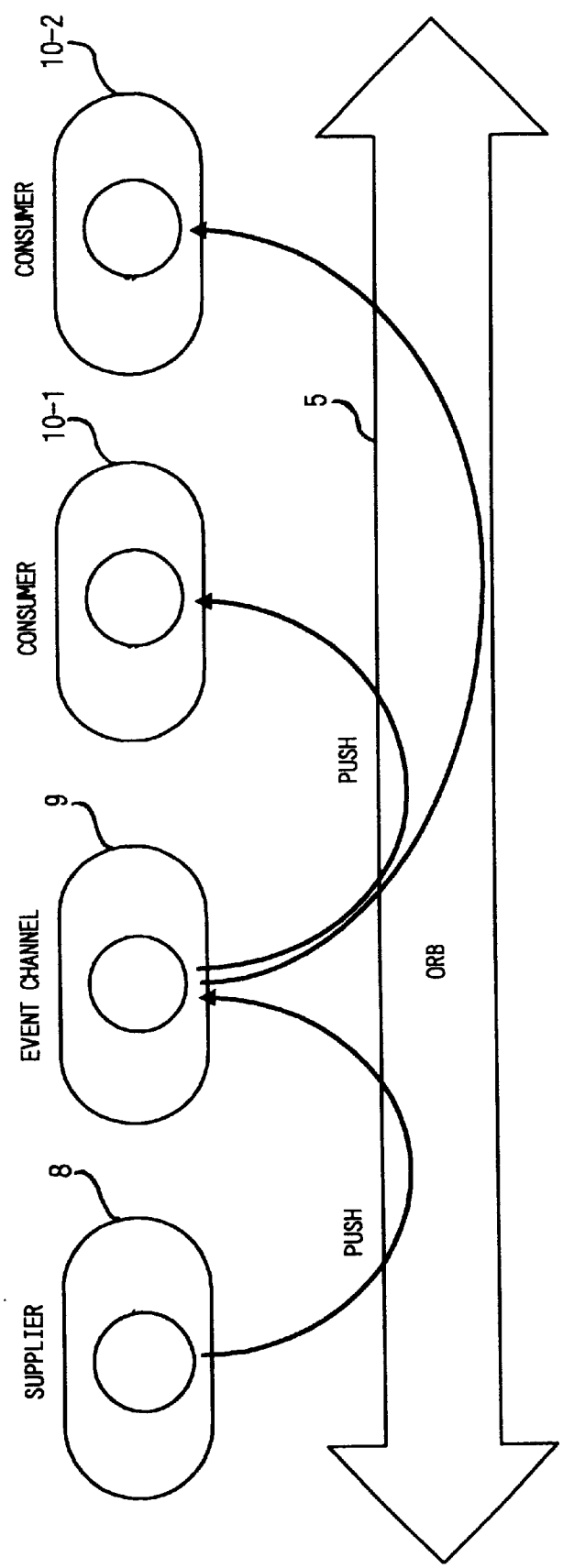
FIGS. 7 and 8 illustrate push style communication system and pull style communication system.
Figure 8:
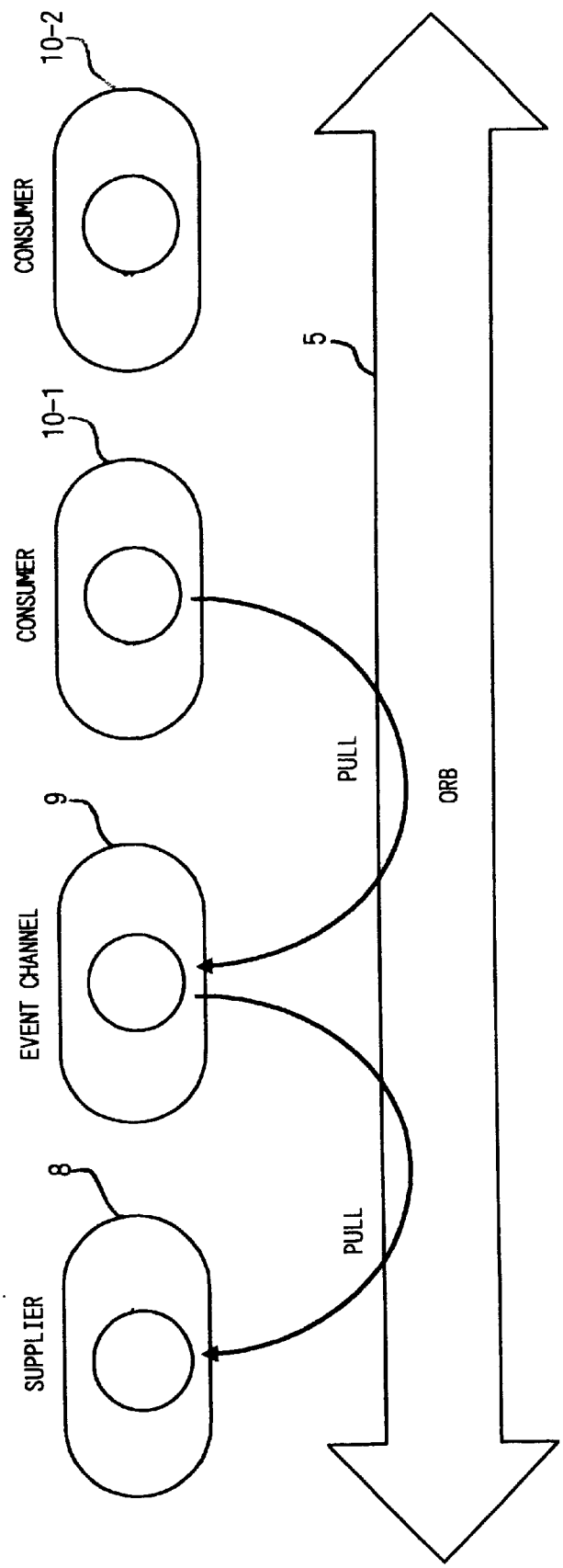

FIG. 5 illustrates the operation of the health check function in the system shown in FIG. 2. The health check function according to one embodiment of the present invention will specifically be described with reference to FIG. 5.

As shown in FIG. 5, a health check send time of 30 seconds and a time out period of 60 seconds are defined in the configuration file 4. In this case, a server that is a sender of events (supplier 1) transmits health check data to clients A and B that are receivers of events (consumers 2-1 and 2-2) via an event channel 3 every 30 seconds. The server also transmits an alarm notice to the clients A and B, depending on the system status within the server. On the other hand, the clients A and B receive the alarm notice and the health check data transmitted via the channel 3. In so doing, if the clients A and B have not received any health check data for a time out period of 60 seconds, they will assume that a communication error has occurred between the clients and the server and then pass an alarm on to the user.

Though the above description has been made with respect to the cases where there is one or two clients against one server, the present invention is also applicable to cases of multi-server and multi-client situations where a plurality of both clients and servers may exist.

Also, though the event transmitted from a server to a client has been described as an alarm notification, the present invention may be applied to other events, such as a notification of object creation, an object deletion, etc.

Thus, the supplier 1 sends the health check data distinguishable from other events to the consumers 2, 2-1 and 2-2 at the time interval defined in the configuration file 4 and, if the health check data or the event has not been received for the time out period defined in the configuration file 4, the consumers 2, 2-1 and 2-2 will send an alarm on the assumption that a communication error such as disconnection has occurred between the client and the server. In other words, the client that is a receiver of events may detect communication errors such as disconnection between the client and the server by the addition of the health check function to the push style event service which is a common object service of CORBA.

As described above, according to the present invention, therefore, a requested client may advantageously detect any errors such as disconnection between the client and a server in the push style by transmitting data at a predetermined time interval for detecting any communication errors between the server and the client and then sending an alarm if, after receiving the data, the client has not received the next data or an event within a predefined period of time.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A network management system comprising a common object request broker architecture (CORBA) utilizing a push style of event service in which transmission of an event object from a server to a client is initiated by said server and is performed asynchronously via an event channel such that a plurality of servers may communicate with a plurality of clients asynchronously within the system without knowledge of each other;

wherein said server includes transmission means for transmitting event data as required, and health check data at predetermined time intervals defined as health check send time intervals, wherein said client includes reception means for receiving health check data at said predetermined health check send time intervals to detect communication error based on failure to detect said receipt, where said server and client both have access to said health check data send time interval and a health check data transmission time-out period to enable both the server and the client to detect communication errors between said server and said client based thereon, and wherein an alarm is sent by an alarm means when a communication error is detected.

2. The network management system according to claim 1, further including storage means for storing said health check data transmission time out period and said health check data send time intervals, wherein said storage means is shared and accessed by said server and said client; and wherein said server transmits said health check data via said transmission means based on the health check send time interval read from said storage means.

3. The network management system according to claim 1, wherein the said health check data transmission time out period and said health check send time periods are stored in a configuration file shared and accessed by both said server and said client.

4. A network management system comprising a common object request broker architecture (CORBA) utilizing a push style of event service in which transmission of an event object from a server to a client is initiated by said server and is performed asynchronously via an event channel such that a plurality of servers may communicate with a plurality of clients asynchronously within the system;

wherein said client includes means for periodically receiving health check data for executing a health check to determine communication errors, if any, between server and client, and reception means for receiving said transmitted health check data via said event object detection means for detecting whether or not, after receiving said health check data, either health check data to be sent subsequently to said health check data or said event has not been received within a predefined health check data transmission time out period, and means for sending an alarm when said detection means detects that neither said health check data to be sent subsequently nor said event has been received within said predefined health check data transmission time out period.

5. A network management system according to claim 4, further including:

storage means for storing said predefined health check data transmission time out period and said health check data send time interval, said storage means being shared and accessed by both said server and said client;

wherein said client detects through said detection means whether or not either said health check data to be sent subsequently or said event has been received based on said predefined health check data transmission time out period read from said storage means.

6. The network management system according to claim 4, wherein said health check data transmission time out period and said health check data send time interval are stored in a configuration file shared and accessed by both said server and said client.

7. A network management system comprising a common object request broker architecture (CORBA) and utilizing a push style of event service in which transmission of an event object from a server to a client is initiated by said server and is performed asynchronously via an event channel;

wherein said server includes transmission means for transmitting health check data at a predetermined health check data send time interval, for detecting communication errors between said server and said client;

said client includes means for receiving health check data for executing a health check, and reception means for receiving said health check data, detection means for detecting whether, after receiving said health check data, either health check data to be sent subsequently to said health check data or said event has been received or not within a predefined health check data transmission time out period, and means for sending an alarm when said detection means detects that neither said health check data to be sent subsequently nor said event has been received within said predefined health check data transmission time out period.

8. A network management system according to claim 7, further including:

storage means for storing said predetermined health check data time interval and said predefined health check data transmission time out period, said storage means being shared and accessed by both said server and said client;

wherein said server transmits said health check data from said transmission means based on said predetermined health check data transmission time out period which is read from said storage means;

and wherein said client detects through said detection means one of whether said health check data to be sent subsequently or said event has been received based on said predefined health check data transmission time out period read from said storage means.

9. The network management system according to claim 7, wherein said health check data transmission time out period and said health check data send time intervals are stored in configuration file a and accessed by both said server and said client.

* * * * *